(12) United States Patent
Auriol

(10) Patent No.: US 12,246,820 B2
(45) Date of Patent: Mar. 11, 2025

(54) SYSTEM AND METHOD FOR CONTROLLING THE MODIFICATION OF THE PITCH OF THE BLADES OF A TURBINE ENGINE

(71) Applicant: SAFRAN AIRCRAFT ENGINES, Paris (FR)

(72) Inventor: Jacques Auriol, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/261,702

(22) PCT Filed: Mar. 14, 2022

(86) PCT No.: PCT/EP2022/056441
§ 371 (c)(1),
(2) Date: Jul. 17, 2023

(87) PCT Pub. No.: WO2022/200088
PCT Pub. Date: Sep. 29, 2022

(65) Prior Publication Data
US 2024/0124126 A1    Apr. 18, 2024

(30) Foreign Application Priority Data
Mar. 25, 2021   (FR) ...................................... 2103006

(51) Int. Cl.
*B64C 11/40*     (2006.01)
*F04D 27/00*     (2006.01)
(52) U.S. Cl.
CPC ............ *B64C 11/40* (2013.01); *F04D 27/002* (2013.01)

(58) Field of Classification Search
None
See application file for complete search history.

(56) References Cited

U.S. PATENT DOCUMENTS

| 1,959,631 A | 5/1934 | Lambert |
| 2,699,220 A | 1/1955 | Mergen et al. |
| (Continued) | | |

FOREIGN PATENT DOCUMENTS

FR    2831225 A1    4/2003

OTHER PUBLICATIONS

International Search Report Corresponding to International Application No. PCT/EP2022/056441 dated Jun. 13, 2022, 2 pages.

*Primary Examiner* — Kayla Mccaffrey
(74) *Attorney, Agent, or Firm* — RANKIN, HILL & CLARK LLP

(57) ABSTRACT

A system for controlling the modification of the pitch of the blades of a fan of a turbine engine, in particular for an aircraft. The turbine engine comprising blades mounted radially in a drive shaft and a setting device configured to modify the pitch of the blades on the basis of an axial force applied to said setting device. The control system comprises a hydraulic actuator, a hydraulic pump, a connecting ring connected mechanically to the hydraulic pump such that the flow rate of the hydraulic pump is proportional to the relative speed between the drive shaft and the connecting ring, and a magnetic coupling device designed to control the drive speed of the connecting ring in order to control the pitch of the blades independently of the speed of the drive shaft.

15 Claims, 5 Drawing Sheets

(56) References Cited

U.S. PATENT DOCUMENTS

| | | | | |
|---|---|---|---|---|
| 5,205,712 A | * | 4/1993 | Hamilton | F04D 29/323 |
| | | | | 416/162 |
| 5,282,719 A | * | 2/1994 | McCarty | B64C 11/44 |
| | | | | 416/165 |
| 6,767,187 B2 | * | 7/2004 | Franchet | F04D 29/323 |
| | | | | 416/157 R |
| 2019/0136867 A1 | | 5/2019 | Albrecht et al. | |

* cited by examiner

SYSTEM AND METHOD FOR CONTROLLING THE MODIFICATION OF THE PITCH OF THE BLADES OF A TURBINE ENGINE

TECHNICAL FIELD

The present invention relates to a system for controlling the pitch modification of the blades of a turbomachine comprising a plurality of blades with variable pitch angle. By blades, it is understood to mean both blades of a propeller of a turbopropeller and blades of a turbojet fan.

For example, to increase performance and improve efficiency of a turbomachine during all phases of its operation, from take-off to landing, it is known to vary the pitch of the blades. This variable pitch allows the speed of the propeller or fan to be varied in order especially to improve the propulsion efficiency of the propeller, without modifying that of the turbine which is generally set to its continuous maximum speed. In addition, blade pitching during landing reverses thrust, eliminating the need for complex and heavy conventional thrust reversal systems.

The difficulty of a pitch modification control system is that the blades belong to a rotating reference frame and that the modification in blade angle requires a large amount of energy to be transmitted in this rotating reference frame.

Current pitch modification control systems typically comprise hydraulic actuators that provide the necessary force to place the pitch to the desired angle (pitching). Such hydraulic actuators belong to the rotating reference frame and are supplied by a hydraulic pump belonging to the fixed reference frame. These systems are particularly complex, of large overall size, and have significant reliability issues, especially due to the use of rotary joints or connections to transmit hydraulic fluid between the fixed reference frame and rotating reference frame. It is important to minimize leakage from the rotating connections as the pressure drop generated has be compensated for by increasing pumping power, which impacts the mass and efficiency of the actuation system Another solution is to perform an electrical command of an electric actuator with electrical contacts that are rotating, but these have the drawback of wearing out early, which is problematic when they are difficult to access. Another solution is to perform an electrical command via an electrical transformer connected to an electric actuator, which forces to provide an electrical transformer with dimensions similar to the electric motor, which is heavy, of large overall size and expensive. Incidentally, in prior art from patent application FR2831225A1, an electrohydraulic device comprising a hydraulic cylinder supplied by a hydraulic pump controlled by an electric motor, all of which belong to the rotating reference frame, is known. The electric motor, belonging to the rotating reference frame, is controlled and supplied by induction via a control circuit belonging to the fixed reference frame. The electric motor has to be powerful enough to supply the hydraulic pump. Such an electric motor increases the mass in the rotating reference frame, which is a drawback. In addition to the difficulties in transmitting power in the rotating reference frame, another difficulty is to manage failure cases during this power transfer. Indeed, during a failure, it is necessary to put the propeller in a safe position to limit drag, a failure leads to both the loss of actuation and the inability to secure the propeller. Full redundancy of the rotating transfer is severely detrimental to the mass.

A system for controlling and changing the pitch of the blades of an airplane propeller is also known in prior art from patent application U.S. Pat. No. 2,699,220A.

Thus, the invention aims to eliminate at least some of these drawbacks.

SUMMARY

The invention relates to a system for controlling the pitch modification of the blades of a fan of a turbomachine, in particular for an aircraft, the turbomachine comprising a drive shaft extending along a longitudinal axis and adapted to be rotatably driven about said longitudinal axis relative to a fixed structure of said turbomachine, blades radially mounted with respect to the drive shaft and adapted to be oriented at a blade pitch and an orientation device configured to modify the pitch of the blades as a function of an axial load applied to said orientation device, the control system comprising a hydraulic actuator, rotatably integral with the drive shaft, in order to apply the axial load to said orientation device and a hydraulic pump, rotatably integral with the drive shaft, supplying power to the hydraulic actuator in order to apply the axial load to said orientation device as a function of the flow rate of the hydraulic pump.

The invention is remarkable in that the control system includes a connecting ring gear rotatably mounted about said longitudinal axis relative to the fixed structure of said turbomachine, said connecting ring gear being mechanically connected to the hydraulic pump in such a way that the flow rate of the hydraulic pump is proportional to the relative speed between the drive shaft and the connecting ring gear, and a magnetic coupling device configured to pilot the driving speed of the connecting ring gear in order to control the pitch of the blades independently of the speed of the drive shaft.

By virtue of the invention, energy fed to the pump is taken from the drive shaft, which avoids the need for high electrical power transmission as in prior art. Advantageously, the blade angle can be adjusted simply by braking the connecting ring gear. The magnetic coupling device is easy to maintain and is reliable as there is no contact. Advantageously, the fluid circuit is closed (without power supply) and belongs only to the rotating reference frame.

Preferably, the hydraulic actuator comprises an actuator body comprising a first chamber and a second chamber configured to receive a hydraulic fluid so as to translationally move the actuator body along the longitudinal axis as a function the pressure in the chambers. Preferably, the hydraulic pump is configured to supply the first chamber. Preferably, the hydraulic pump is configured to collect hydraulic fluid in the second chamber.

Preferably, the hydraulic pump being configured to move the hydraulic actuator in a first direction, in particular downstream, the control system comprises a return member configured to exert an axial return load in a second direction opposite to the first direction, in particular upstream. Advantageously, the return device is configured to reduce the pitch of the blades to the safe position. The return member thus performs a safety function by automatically reducing the pitch in the event of a lack of hydraulic pressure. Advantageously, securing is passive. The return member is preferably in the form of a spring.

Preferably, in the absence of magnetic coupling, the connecting ring gear is rotatably driven by the hydraulic pump, in particular, at the same rotational speed. Thus, in order to create a speed differential, the coupling device should slow down the connecting ring gear, which requires little energy and also allows its collection.

Preferably, the magnetic coupling device comprises a permanent magnet electric machine comprising stator members integral with the fixed structure and rotor members, integral with the connecting ring, which are magnetically coupled with the stator members so as to magnetically brake the connecting ring gear.

According to one aspect of the invention, the magnetic coupling device further comprises a control unit configured to provide a control current to the stator members in order to vary the braking force.

Preferably, the control unit is integral with the fixed structure. It can advantageously be housed in a compartment with favorable temperature and pressure conditions, which increases reliability and reduces cost.

According to a preferred aspect, the control unit comprises at least one variable resistor. This makes it possible to conveniently set the braking force and to collect heat and electrical energy when braking.

According to one aspect of the invention, the control system comprises at least two hydraulic pumps, the hydraulic pumps in particular being connected in series or in parallel. Such hydraulic pumps provide redundancy and balancing of the whole.

According to one aspect of the invention, the control system comprises at least one overspeed management system configured to modify the power supply to the hydraulic actuator in the event of detection of an overspeed. This ensures safety.

The invention also relates to a turbomachine fan module comprising a control system as previously set forth.

The invention also relates to a turbomachine, in particular for an aircraft, comprising a drive shaft extending along a longitudinal axis and adapted to be rotatably driven about said longitudinal axis with respect to a fixed structure of said turbomachine, blades radially mounted in said drive shaft and adapted to be oriented at a blade pitch and an orientation device configured to modify the pitch of the blades as a function of an axial load applied to said orientation device, the turbomachine comprising a control system as previously set forth to apply the axial load to the orientation device.

The invention also relates to a method for controlling the pitch modification of the blades of a turbomachine fan by means of a control system as previously set forth, the method comprising:
 a step of modifying the drive speed of the connecting ring gear by the magnetic coupling device,
 a step of driving the hydraulic pump, by the connecting ring gear, in order to activate the hydraulic actuator and apply an axial load to the orientation device and
 a step of modifying the pitch of the blades as a function of the axial load applied to the orientation device.

DESCRIPTION OF THE DRAWINGS

The invention will be better understood upon reading the following description, given as an example, and by referring to the following figures, given as non-limiting examples, wherein identical references are given to similar objects.

It should be noted that the figures set out the invention in detail in order to implement the invention, said figures may of course be used to better define the invention if necessary.

DETAILED DESCRIPTION

The invention will be set forth for a turbopropeller but the invention applies to any turbomachine having rotating blades whose pitch can be modified, in particular, a turbojet having a fan with rotating blades or a turbopropeller having a propeller with rotating blades. Subsequently, for the sake of brevity, the term "fan" will be used to refer to both a turbojet fan and a propeller of a turbopropeller.

Subsequently, the invention will be set forth in connection with a turbopropeller but the invention also applies to a turbojet.

Figure 1:
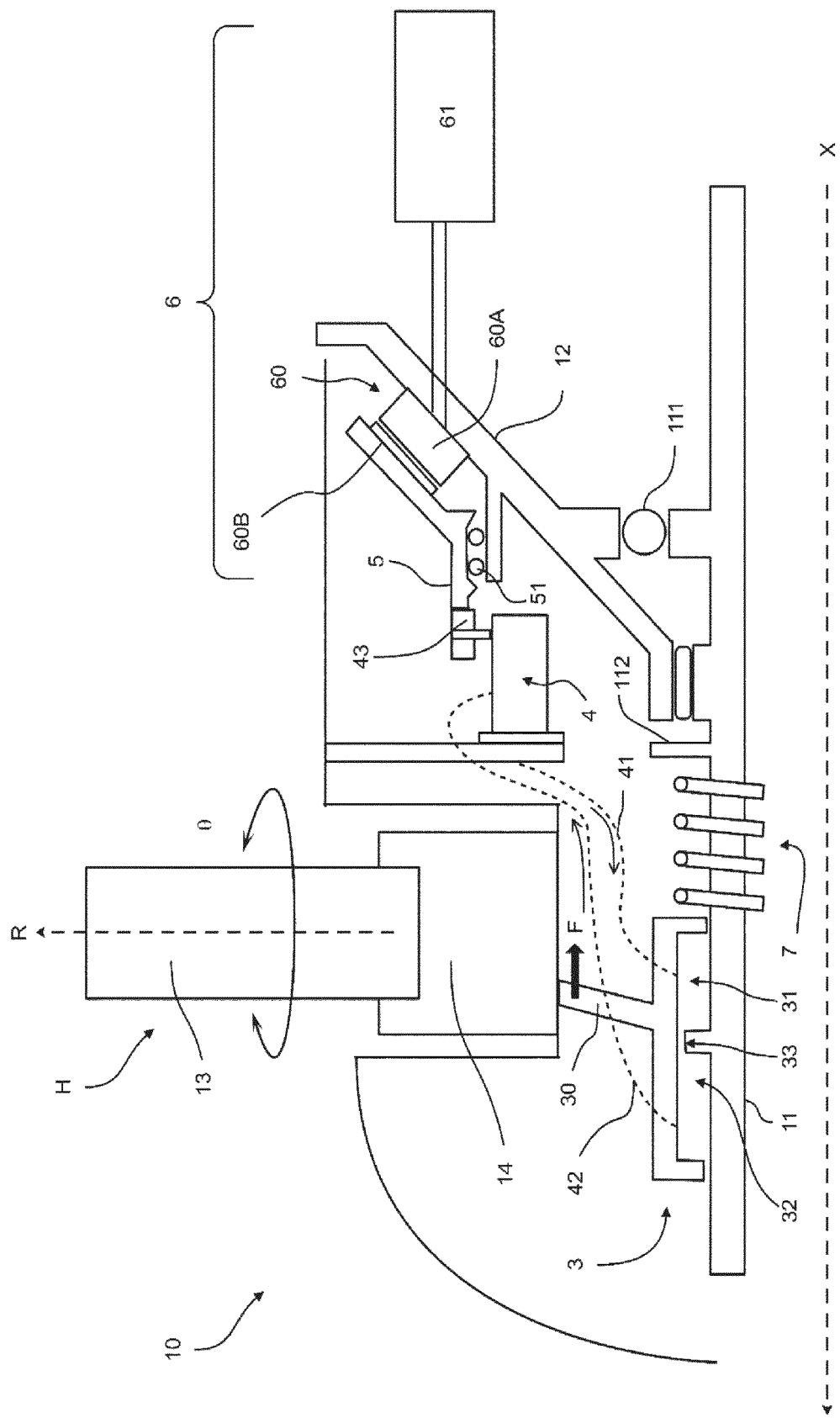
FIG. 1 is a schematic representation in a longitudinal cross-section view of a turbomachine according to one embodiment of the invention.

With reference to FIG. 1, a partial cross-section view of a turbopropeller 10 according to one embodiment of the invention is represented.

The turbomachine 10 comprises a drive shaft 11 extending along a longitudinal axis X and adapted to be rotatably driven about said longitudinal axis X relative to a fixed structure 12 of said turbomachine 10, in particular, via bearings 111. Subsequently, the terms "downstream" and "upstream" are determined in relation to the longitudinal axis X, which is oriented from downstream to upstream in FIG. 1.

The turbomachine 10 comprises a fan H comprising blades 13 radially mounted with respect to said drive shaft 11, in particular via a hub, and adapted to be oriented at a pitch θ with respect to a radial axis R which is orthogonal to the longitudinal axis X. Subsequently, the pitch θ varies between a minimum pitch, where blades 13 are 'feathered' and a maximum pitch.

Still with reference to FIG. 1, the turbomachine 10 comprises an orientation device 14 configured to modify the pitch θ of the blades 13 as a function of an axial load F applied to said orientation device 14. Such an orientation device 14 is known to those skilled in the art, in particular from patent application FR3036093. Preferably, the orientation device 14 includes crank pins off-centered with respect to the radial axis R.

In order to modify the pitch of the blades 13, the turbomachine 10 comprises a control system which comprises a hydraulic actuator 3, a hydraulic pump 4, a connecting ring gear 5 and a magnetic coupling device 6 which will be set forth in detail.

The hydraulic actuator 3 is configured to apply an axial load F to said orientation device 14. In this example, the hydraulic actuator 3 is in the form of a hydraulic cylinder mounted externally to the drive shaft 11 and rotatably integral with it. In other words, the hydraulic actuator 3 belongs to the rotating reference frame.

In this example, the hydraulic actuator 3 conducts oil, but it goes without saying that other hydraulic fluids could be contemplated.

With reference to FIG. 1, the hydraulic actuator 3 comprises an actuator body 30 comprising a first chamber 31 and a second chamber 32 configured to receive hydraulic fluid so as to translationally move the actuator body 30 along the longitudinal axis X as a function of the pressure in the chambers 31, 32. In this embodiment, the first chamber 31 is downstream of the second chamber 32. In this example, as will be set forth later, when the pressure in the first chamber 31 is increased, the actuator body 30 moves downstream. The hydraulic actuator 3 further comprises a calibrated opening 33 which allows fluid to circulate from the first chamber 31 to the second chamber 32 with a controlled flow rate. The chambers 31 and 32 are separated by a wall belonging to the drive shaft 11.

In this example, the first chamber 31 is a supply chamber by the hydraulic pump 4 while the second chamber 32 is a collection chamber of the hydraulic pump 4. The hydraulic pump 4 thus allows the actuator body 30 to be moved axially downstream.

In this example, the actuator body 30 moves between an end upstream position that corresponds to the minimum pitch and an end downstream position that corresponds to the maximum pitch.

Preferably, the hydraulic actuator 3 has sensors configured to detect position of the hydraulic actuator 3 and compare it with its setpoint position as will be set forth later.

Still referring to FIG. 1, the turbomachine 10 further comprises a return member 7 configured to exert an axial return load directed upstream on the orientation device 14, that is in the opposite direction to that of drive by the hydraulic pump 4.

In this example, with reference to FIG. 1, the return member 7 is mounted about the drive shaft 11 between a stop member 112 of the drive shaft 11 and the actuator body 30 in order to exert a stress directly upstream on the actuator body 30.

Thus, when the hydraulic pressure increases in the first chamber 31, the return member 7 makes it possible to oppose the downstream movement. When the first chamber 31 is no longer under pressure, the return member 7 allows the actuator body 30 to be returned upstream to the safety position by forcing fluid circulation from the first chamber 31 to the second chamber 32 via the calibrated opening 33. In other words, the return member 7 enables the blades 13 to be passively feathered.

As will be set forth later, the return member 7 advantageously improves safety by reducing pitch of the blade 13 in the event of a control system malfunction. The blades 13 are advantageously brought back to a safe position (feathered blades) in the absence of hydraulic pressure supplied by the hydraulic pump 4.

Preferably, the return member 7 is in the form of a spring, but it goes without saying that it could be in other forms, for example, a flexible rod or a counterweight.

According to one aspect of the invention, the magnetic coupling device 6 is configured to rotate the connecting ring gear 5 in both directions and thus dynamically control axial position of the hydraulic actuator 3. This means that a distinct return member is not required.

Still with reference to FIG. 1, the hydraulic pump 4 is rotatably integral with the drive shaft 11 and supplies the hydraulic actuator 3 in order to apply the axial load F to said orientation device 14 as a function of the flow rate of the hydraulic pump 4. Thus, the hydraulic pump 4 and the hydraulic actuator 3 belong to the same rotating reference frame. The hydraulic pump 4 is connected to the first chamber 31 by a first supply channel 41 and to the second chamber 32 by a second collection channel 42. The hydraulic pump 4 is configured to increase the hydraulic pressure in the first chamber 31. In other words, the hydraulic pump 4 is configured to supply the first chamber 31 with fluid via the first supply channel 41. The fluid circulates into the second collection chamber 32 via the calibrated opening 33 before being collected by the hydraulic pump 4 via the second collection channel 42. Thus, the fluid circuit only belongs to the rotating reference frame, which limits the risk of leakage in comparison with prior art, which required rotary joints to link equipment of the fixed reference frame and of the rotating reference frame.

As the channels 41, 42 are rotary, the fluid circuit loop configuration advantageously avoids the appearance of a pressure difference which would modify the equilibrium position of the hydraulic actuator 3. In practice, when the pressures are summed up over the entire fluid circuit loop, the "rising" pressure and the "descending" pressure in relation to the axis of rotation X are summed up, resulting in a total zero value.

Preferably, the hydraulic pump 4 is a fixed volume pump, in particular a gear pump.

With reference to FIG. 1, the hydraulic pump 4 includes a mechanical input 43 configured to receive an input torque. Depending on the input torque applied to the mechanical input 43, the hydraulic pump 4 applies a different flow rate and therefore a different pressure in the first chamber 31. In other words, the hydraulic pump 4 makes it possible to convert the input torque into a flow rate setpoint, which advantageously modifies the axial load F.

Figure 2:
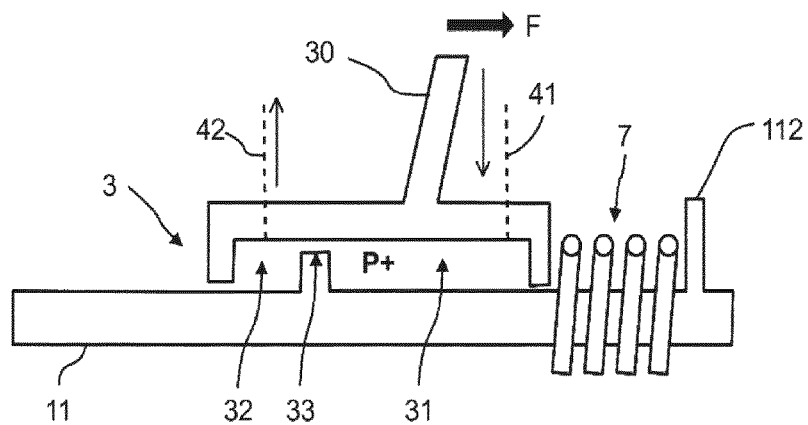
FIG. 2 shows a schematic representation in a longitudinal cross-section view of the hydraulic actuator in a downstream position.
Figure 3:
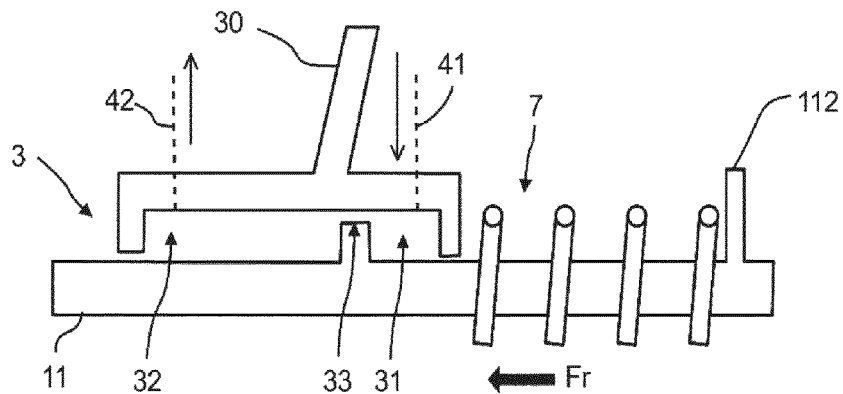
FIG. 3 shows a schematic representation in a longitudinal cross-section view of the hydraulic actuator in an upstream position.

In this example, when the input torque is high, the hydraulic pump 4 increases the pressure in the first chamber 31, which moves the actuator body 30 downstream and compresses the return member 7 as illustrated in FIG. 2. Conversely, when the input torque is low or zero, the hydraulic pump 4 does not supply any flow rate and the pressure between the chambers 31, 32 is balanced by the return member 7 as illustrated in FIG. 3. The return member 7 controls a small pitch angle and the blades 13 are in a safe position. This means that in the event of a malfunction of the hydraulic pump 4, safety is ensured by the return member 7.

Preferably, the mechanical input 43 is in the form of a drive pinion which meshes with the connecting ring gear 5. Advantageously, the connecting ring gear 5 is only coupled to the hydraulic pump 4 so that, in the absence of magnetic coupling, the hydraulic pump 4 does not (or only slightly) supply the hydraulic actuator 3. The mechanical input 43 and the hydraulic pump 4 mechanically cooperate so that the mechanical input 43 rotatably drives the connecting ring gear 5 in the absence of magnetic coupling. Indeed, the hydraulic pump 4 belongs to the rotating reference frame and is rotatably driven. As will be set forth below, the magnetic coupling device 6 makes it possible to magnetically brake the connecting ring gear 5 to generate a speed difference between the connecting ring gear 5 and the hydraulic pump 4.

The connecting ring gear 5 is rotatably mounted about said longitudinal axis X with respect to the fixed structure 12 of said turbomachine 10 and is configured to provide the input torque applied to the mechanical input 43 of the hydraulic pump 4. As illustrated in FIG. 1, the connecting ring gear 5 is connected to the fixed structure 12 via bearings 51.

The connecting ring gear 5 is mechanically connected to the hydraulic pump 4 so that the flow rate of the hydraulic pump 4 is proportional to the relative speed between the drive shaft 11 and the connecting ring gear 5. As explained previously, the hydraulic pump 4 is rotatably integral with the drive shaft 11. Since the rotational speed of the drive shaft 11 is known, adjusting the rotational speed of the connecting ring gear 5 is sufficient to adjust the relative speed between the drive shaft 11 and the connecting ring gear 5 to modify the flow rate of the hydraulic pump 4. As the connecting ring gear 5 is rotatably driven by the hydraulic pump 4, it is sufficient to brake the connecting ring gear 5 to adjust the relative speed between the drive shaft 11 and the connecting ring gear 5.

The magnetic coupling device 6 is configured to modify the drive speed of the connecting ring gear 5 about said longitudinal axis X in order to indirectly control the pitch of the blades 13. In particular, the magnetic coupling device 6 performs a magnetic braking function for the connecting ring gear 5.

With reference to FIG. 1, the magnetic coupling device 6 comprises a permanent magnet electric machine 60 comprising stator members 60A integral with the fixed structure 12 and rotor members 60B, integral with the connecting ring gear 5, which are magnetically coupled with the stator members 60A. The magnetic coupling device 6 further comprises a control unit 61, belonging to the fixed reference frame, configured to provide a control current to the stator members 60A in order to vary the rotational speed of the connecting ring gear 5.

Thus, in summary, the control unit 61 can conveniently control the pitch θ of the blades 13. The contactless magnetic connection between the fixed structure 12 and the connecting ring gear 5 reduces complexity by keeping the hydraulic members (hydraulic actuator 3 and hydraulic pump 4) only in the rotating reference frame. In addition, there is no need for an electric motor to control the hydraulic pump 4. The energy required for activation is taken directly from the drive shaft 11 via the connecting ring gear 5. Power transfer is simplified, which also makes maintenance easier.

Preferably, in order to facilitate maintenance, the magnetic coupling device 6 is configured to generate a rotating magnetic field in order to control the hydraulic actuator 3 when the turbomachine 10 is stopped. According to one preferred aspect, as mentioned previously, the magnetic coupling device 6 is configured to generate a magnetic field rotating in both directions to dynamically control position of the hydraulic actuator 3 upstream and downstream without a return member 7.

Alternatively, when the aircraft is on the ground, an auxiliary device may be connected to the magnetic coupling device 6 to generate a rotating magnetic field in order to control the hydraulic actuator 3. In other words, the auxiliary device can be used during maintenance to check the operation of the control system.

A method for controlling pitch modification of the blades 13 will now be set forth. In this example of implementation, the permanent magnet electric machine 60 is initially deactivated and the connecting ring gear 5 is rotatably integral with the hydraulic pump 4, which itself is rotatably integral with the drive shaft 11. The hydraulic pump 4 is not supplied and there is no overpressure in the first chamber 31 of the hydraulic actuator 3. The body of the actuator 30 is restricted in the upstream position by the return member 7 as illustrated in FIG. 3, the pitch θ then being minimal.

In this example, the control unit 61 receives a command for modifying the pitch of the blades 13 from, for example, a calculator of the turbomachine.

Figure 4:
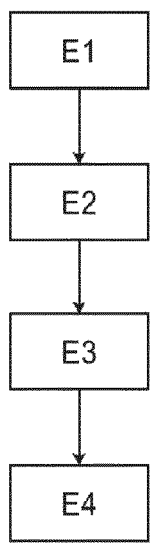
FIG. 4 is a schematic representation of a method for controlling pitch modification of the blades.

With reference to FIG. 4, the method comprises a step of modifying E1 the electromotive force FEM in the permanent magnet electric machine 60. The result is a step of modifying E2 the drive speed of the connecting ring gear 5 by the magnetic coupling device 6. In this example, the permanent magnet electric machine 60 brakes the connecting ring gear 5. The relative speed between the hydraulic pump 4 and the connecting ring gear 5 increases.

The method comprises a step of driving E3 the hydraulic pump 4, via the connecting ring gear 5, in order to activate the hydraulic actuator 3 and apply an axial load F to the orientation device 14. In practice, the relative speed activates the hydraulic pump 4 which supplies the first chamber 31 of the hydraulic actuator 3. The actuator body 30 moves downstream against the return member 7 and applies an axial load F to the orientation device 14 as illustrated in FIG. 2.

This results in a step of modifying E4 the pitch θ of the blades 13 as a function of the axial load F applied to said orientation device 14. In this case, the pitch θ of the blades 13 increases to flatten the blades 13.

Thus, by setting the electromotive force FEM, the pitch θ of the blades 13 can be conveniently controlled. Advantageously, the activation force of the hydraulic pump 4 is taken from the drive shaft 11, which improves efficiency.

When the electromotive force FEM is stopped, the return force Fr of the return member 7 moves the hydraulic actuator 3 upstream, which modifies the pitch θ of the blades 13 to the safety position as illustrated in FIG. 3. This ensures safety even if the magnetic coupling 6, the connecting ring gear 5 or the hydraulic pump 4 fail.

Figure 5:
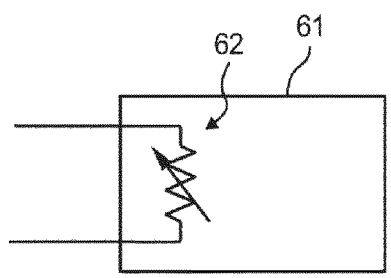
FIG. 5 is a schematic representation of a control unit of the magnetic coupling device.

According to one aspect of the invention, with reference to FIG. 5, the control unit 61 comprises a variable resistor 62 so as to vary the current flowing in the stator members 60A and thus vary the rotational speed of the connecting ring gear 5 to control the pitch θ of the blades 13.

Advantageously, when the hydraulic pump 4 is supplied, permanent braking of the connecting ring gear 5 generates current in the variable resistor 62, which can be collected and subsequently used. In practice, electricity generation is more important at a very high pitch θ, that is at cruise power. Conversely, only the feathered position (minimum pitch) produces no energy. An electric battery may be provided to store electric energy from the variable resistor 62 and distribute it to other equipment, for example the fuel pump. Still preferably, a battery may also be provided to store heat energy from the variable resistor 62.

Figure 6:
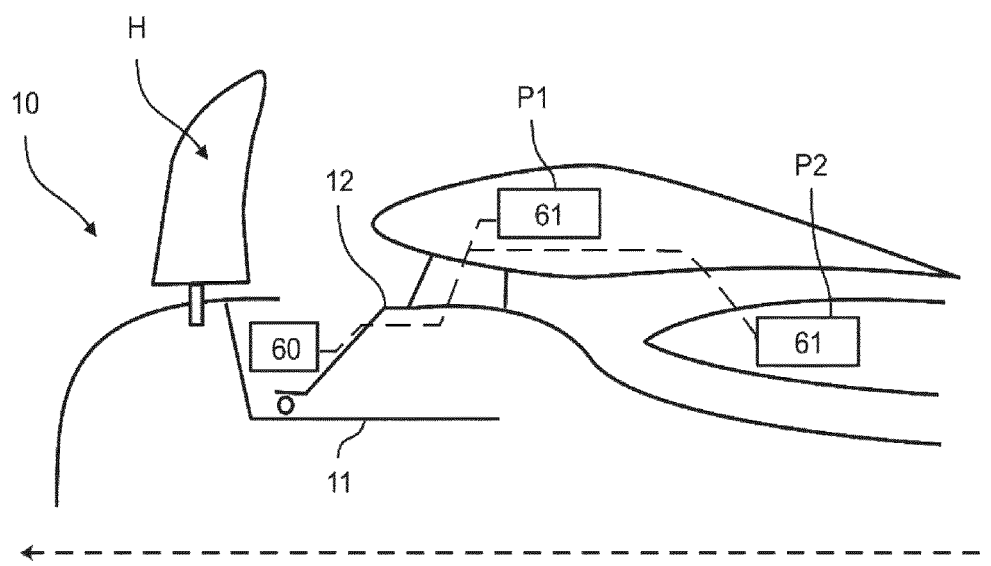
FIG. 6 is a schematic representation of possible positions for the installation of a control unit in a turbomachine.

Preferably, the control unit 61 is positioned in a mild thermal environment, for example, in proximity to the turbomachine regulation calculator. By way of example, with reference to FIG. 6, the control unit 61 may be positioned at different positions of the turbomachine, in particular, in the nacelle (position P1) or downstream in the "core" zone (position P2), which is located between the inner wall of the secondary stream and the outer wall of the primary stream.

Figure 7:
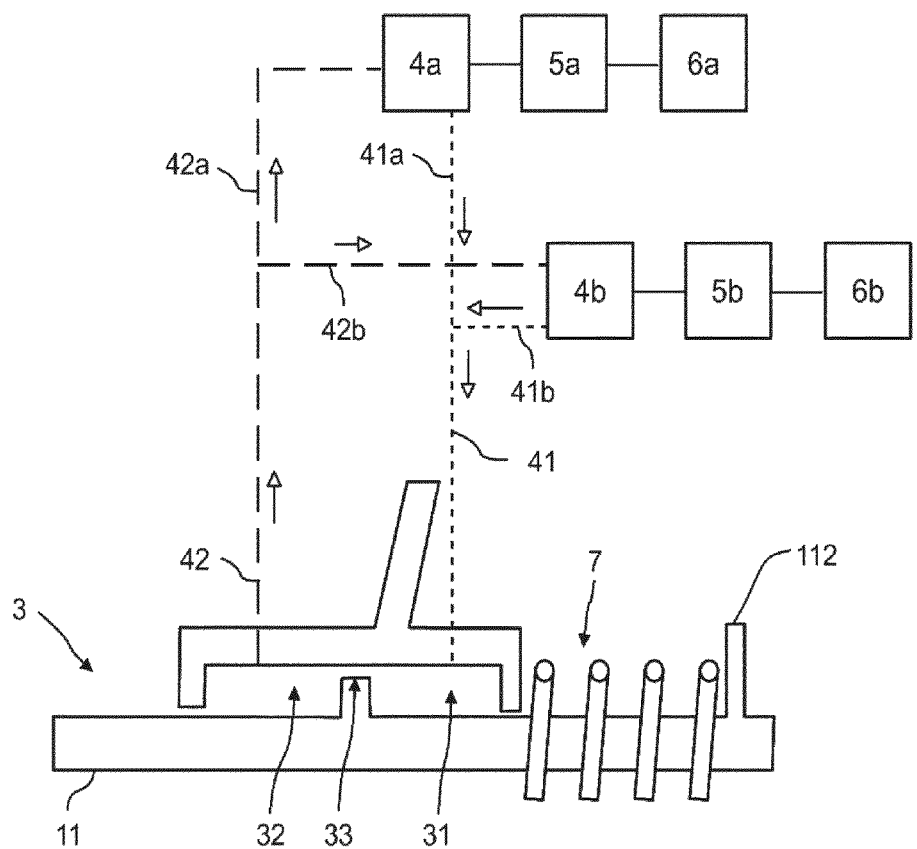
FIG. 7 is a schematic representation of a first alternative of the control system to provide redundancy.

According to one aspect of the invention, with reference to FIG. 7, a first example of the "series" type redundancy is represented. In this figure, the turbomachine 10 comprises a first hydraulic pump 4a connected to a first connecting ring gear 5a and to a first magnetic coupling system 6a. Similarly, a second hydraulic pump 4b connected to a second connecting ring gear 5b and to a second magnetic coupling system 6b in order to provide redundancy is represented.

The first chamber 31 of the hydraulic actuator 3 is supplied by a first supply channel 41 supplied, on the one hand, by a first elementary supply channel 41a connected to the first hydraulic pump 4a and, on the other hand, by a second elementary supply channel 41b connected to the second hydraulic pump 4b.

The second chamber 32 of the hydraulic actuator 3 is connected to a second collection channel 42 connected, on the one hand, to a first elementary return collection channel 42a connected to the first hydraulic pump 4a and, on the other hand, to a second elementary collection channel 42b connected to the second hydraulic pump 4b.

In nominal operation, the first hydraulic pump 4a and the second hydraulic pump 4b both supply the first chamber 31 of the hydraulic actuator 3. Each magnetic coupling system 6a, 6b provides calibrated braking.

In the event of a failure, for example due to a short circuit of the second magnetic coupling system 6b that increases the electromotive force FEM, the second hydraulic pump 4b is actuated in the absence of a modification order. Such a modification leads to a downstream movement of the hydraulic actuator 3 and to flattening of the blades 13, that is in contrast to "feathering" safety.

When it is detected that the position of the hydraulic actuator 3 is different from the position setpoint, the first magnetic coupling system 6a reduces its electromotive force as much as possible to reduce the flow rate of the first hydraulic pump 4a and thus compensates for the increase caused by the second hydraulic pump 4b. This eliminates unwanted movement of the hydraulic actuator 3. Advantageously, failure of one of the hydraulic pumps 4a, 4b can be compensated for by using two hydraulic pumps 4a, 4b in series.

Alternatively, in order to prevent one of the hydraulic pumps 4a, 4b from providing a supply flow rate, a check valve may be provided on one of the hydraulic pumps 4a, 4b, which allows the hydraulic actuator 3 to be actuated independently, the actuation speed corresponding to the sum of the two hydraulic pumps 4a, 4b. Optionally, in order to prevent one of the hydraulic pumps 4a, 4b from controlling the hydraulic actuator 3 towards large pitches θ, an overspeed management mechanism known to those skilled in the art as the term "Overspeed Governor" for turbopropellers can be provided. If the pitch θ becomes too low, the speed increases and can be detected. These aspects will be set forth in detail later.

Figure 8:
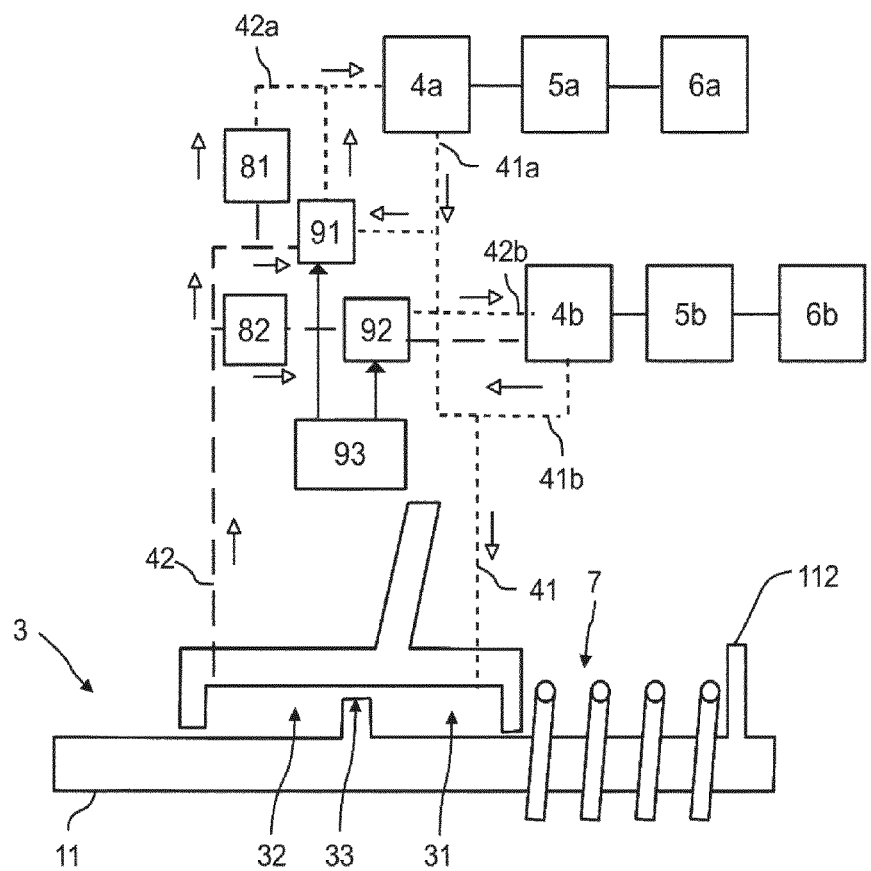
FIG. 8 is a schematic representation of a second alternative of the control system to provide redundancy.

According to another aspect of the invention, with reference to FIG. 8, a second example of "parallel" type redundancy is represented.

In this figure, analogously to previously, the turbomachine 10 comprises a first hydraulic pump 4a connected to a first connecting ring gear 5a and to a first magnetic coupling system 6a. Similarly, a second hydraulic pump 4b connected to a second connecting ring gear 5b and to a second magnetic coupling system 6b in order to provide redundancy is represented.

The first chamber 31 of the hydraulic actuator 3 is supplied by a first supply channel 41 supplied, on the one hand, by a first elementary supply channel 41a connected to the first hydraulic pump 4a and, on the other hand, by a second elementary supply channel 41b connected to the second hydraulic pump 4b.

The second chamber 32 of the hydraulic actuator 3 is connected to a second collection channel 42 connected, on the one hand, to a first elementary collection channel 42a connected to the first hydraulic pump 4a and, on the other hand, to a second elementary collection channel 42b connected to the second hydraulic pump 4b. In this example, a first check valve 81 is mounted in the first elementary collection channel 42a and a second check valve 82 is mounted in the second elementary collection channel 42b. Such check valves 81, 82 allow the two hydraulic pumps 4a, 4b to be used alternately in the event of a pressure loss in one of the hydraulic pumps 4a, 4b.

In nominal operation, the first hydraulic pump 4a and the second hydraulic pump 4b both supply the first chamber 31 of the hydraulic actuator 3.

Still with reference to FIG. 8, an overspeed management mechanism, comprising a first member 91 and a second member 92, is also present. The first member 91 is mounted in the first elementary collection channel 42a in parallel with the first check valve 81. The second member 92 of the overspeed management mechanism is mounted in the second elementary collection channel 42b in series with the second check valve 82. The first member 91 and the second member 92 of the overspeed management mechanism are both connected to the first elementary supply channel 41a as illustrated in FIG. 8.

If one of the hydraulic pumps 4a, 4b fails, the overspeed management mechanism comprises a speed detection member 93 which, above a predetermined speed threshold, controls the first member 91 and/or the second member 92 to divert supply to the first chamber 31 and place the blades 13 in the safety position. Preferably, the speed detection member 93 comprises a centrifugal force-sensitive counterweight mounted with a return member in order to determine the speed threshold. Preferably, each member 91, 92 is in the form of a sliding spool so as to directly connect an inlet channel and a return channel of a hydraulic pump 4a, 4b in the event of overspeed. In other words, each member 91, 92 comprises at least two positions (a pass position and a safety deflection position) which are controlled by the speed detection member 93. This prevents any unwanted modification to the pitch θ. Of course, several counterweights could be used on several spools.

When two hydraulic pumps 4a, 4b are used, they are preferably positioned diametrically opposite to each other in order to reduce imbalance.

The invention claimed is:

1. A control system for controlling a pitch modification of blades of a fan of a turbomachine for an aircraft, the turbomachine including a drive shaft extending along a longitudinal axis and adapted to be rotatably driven about said longitudinal axis with respect to a fixed structure of said turbomachine, the blades are radially mounted with respect to said drive shaft and adapted to be oriented at a blade pitch, and an orientation device configured to modify the blade pitch as a function of an axial load applied to said orientation device, the control system comprising:
  a hydraulic actuator coupled to the drive shaft to be rotatable therewith, in order to apply the axial load to said orientation device,
  a hydraulic pump coupled to the drive shaft to be rotatable therewith and supplying the hydraulic actuator in order to apply the axial load to said orientation device as a function of the flow rate of the hydraulic pump,
  a connecting ring gear mounted about said longitudinal axis with respect to the fixed structure of said turbomachine, said connecting ring gear being mechanically connected to the hydraulic pump so that the flow rate of the hydraulic pump is proportional to a relative speed between the drive shaft and the connecting ring gear, and a magnetic coupling device configured to pilot the drive speed of the connecting ring gear in order to control the blade pitch independently of a speed of the drive shaft.

2. The control system according to claim 1, wherein the hydraulic actuator comprises an actuator body having a first chamber and a second chamber configured to receive hydraulic fluid so as to translationally move the actuator body along the longitudinal axis as a function of a pressure in the first and second chambers.

3. The control system according to claim 1, the hydraulic pump being configured to move the hydraulic actuator in a first direction, the control system comprises a return member configured to exert an axial return load in a second direction opposite to the first direction.

4. The control system according to claim 1, wherein in the absence of magnetic coupling, the connecting ring gear is rotatably driven by the hydraulic pump.

5. The control system according to claim 1, wherein the magnetic coupling device comprises a permanent magnet electric machine comprising stator members integral with the fixed structure and rotor members, integral with the connecting ring gear, which are magnetically coupled with the stator members so as to magnetically brake the connecting ring gear.

6. The control system according to claim 5, wherein the magnetic coupling device further comprises a control unit configured to provide a control current to the stator members in order to vary a braking force.

7. The control system according to claim 6, wherein the control unit is integral with the fixed structure.

8. The control system according to claim 6, wherein the control unit comprises at least one variable resistor.

9. The control system according to claim 1, further comprising a second hydraulic pump.

10. The control system according to claim 9, wherein the hydraulic pump and the second hydraulic pump are connected in series.

11. The control system according to claim 9, wherein the hydraulic pump and the second hydraulic pump are connected in parallel.

12. The control system according to claim 1, comprising at least one overspeed management system configured to modify a power supply to the hydraulic actuator in the event of an overspeed detection.

13. A method for controlling the pitch modification of the blades of the fan of the turbomachine by means of the control system according to claim 1, the method comprising:
    modifying the drive speed of the connecting ring gear by the magnetic coupling device,
    driving the hydraulic pump, by the connecting ring gear, in order to activate the hydraulic actuator and to apply the axial load to the orientation device, and
    modifying the pitch of the blades as a function of the axial load applied to said orientation device.

14. The control system according to claim 1, the hydraulic pump being configured to move the hydraulic actuator downstream, the control system comprises a return member configured to exert an axial return load upstream.

15. The control system according to claim 1, wherein in the absence of magnetic coupling, the connecting ring gear is rotatably driven by the hydraulic pump at a same rotational speed.

* * * * *